3,151,141
REDISTRIBUTION OF ALKYL RADICALS IN ALKYL LEAD COMPOSITIONS
Fred S. Arimoto, Newark, Del., assignor to E. I. du Pont de Nemours and Company, Wilmington, Del., a corporation of Delaware
No Drawing. Filed Mar. 8, 1961, Ser. No. 94,126
4 Claims. (Cl. 260—437)

This invention relates to the redistribution of alkyl radicals in alkyl lead compounds containing at least two different alkyl groups and more particularly between tetramethyl lead and tetraethyl lead.

As disclosed in U.S. Patent 2,270,108, this redistribution between the alkyl radicals and the lead may be carried out in the presence of various catalysts of which anhydrous aluminum chloride was apparently the preferred, as illustrated by the specific example given therein. In this process the temperature required was 85° C., and to effect the equilibrium in the redistribution the reaction was carried out for a period of about two hours.

Among the drawbacks experienced in the process of U.S. Patent 2,270,108 is the fact that aluminum chloride is a solid and must be added as such or as a slurry in an inert carrier solvent. It is also known to react violently with tetraalkyl lead with the liberation of heat. Since alkyl lead, particularly tetramethyl lead, is thermally unstable, great care must be taken to avoid undue temperature rises and particularly local overheating which may occur when a solid catalyst is used.

Among the products of the alkyl lead aluminum chloride interaction are alkyl aluminum sesquihalides which are particularly objectional since they are spontaneously inflamable to air. This makes the use of aluminum chloride as a catalyst definitely a fire and explosion hazard. The use of aluminum chloride also tends to form solid bi-products in the reaction which tends to plug the feed and outlet lines. With the use of aluminum chloride considerable loss in yields of tetraalkyl lead is also experienced due to the formation of by-products. Furthermore, when aluminum chloride is used the reaction mixture is corrosive to the equipment, and unless the aluminum compounds are completely washed from the resulting tetraalkyl lead the resulting product is corrosive and unstable on storage.

While a number of alternative catalysts are mentioned in U.S. Patent 2,270,108, they have not been found to be satisfactory for various reasons.

It is therefore an object of the present invention to provide an improved process for effecting interchange of the alkyl groups in mixtures of alkyl lead compounds. It is a further object of the invention to provide a catalyst and effect the interchange of alkyl groups in mixtures of alkyl lead compounds which does not produce any serious fire or explosion hazards and which can be readily added to the mixture of alkyl lead compounds under reaction, and which are effective at normal atmospheric temperatures. A still further object it to employ a catalyst in this interchange process which does not give an undue loss of tetraalkyl lead compounds. A still further object is to provide a process for redistribution of alkyl groups in tetraalkyl lead compounds which can be carried out in the halohydrocarbon scavengers as solvents for the reaction.

The process of effecting the interchange of alkyl groups in tetraalkyl lead compounds according to the present invention is carried out by adding from 0.1 to 3.0% by weight, based on the alkyl lead mixture of a boron trifluoride etherate. The interchange in the presence of this type of catalyst takes place almost instantaneously at ordinarily existing atmospheric temperatures. In this process only a very slight temperature rise is experienced during the reaction, so that no external heating or cooling is necessary and it does not present any serious hazard with regard to the thermal unstability of tetraalkyl lead. Where the alkyl lead compounds do not contain moisture, an even smaller amount of catalyst may be employed to effect this alkyl interchange.

The interchange reaction of the present invention may be carried out in the presence or absence of solvents or diluents. Solvents such as toluene, hexane and other hydrocarbon solvents, including gasoline, may be employed. It has also been found that the reaction takes place readily in the presence of the normally used scavengers for alkyl lead compounds such as ethylenedibromide, ethylenedichloride, and mixtures thereof.

The amount of solvent employed is immaterial since the reaction can be carried out in the absence of any solvent. The maximum amount usually employed will be no more than that ordinarily used in the handling and the blending of the tetraalkyl lead antiknock blends. Larger amounts of solvents may be employed but are not required.

The boron trifluoride etherates which may be used in the present invention are those formed by the reaction of boron trifluoride with alkyl ethers, preferably of lower molecular weight such as dimethyl ether, diethyl ether, methylethyl ethers, dipropyl and dibutyl ethers, or other ethers of the mixed alkyl type. The term "lower alkyl ethers" is used to designate those in which the alkyl groups contain from 1 to 6 carbon atoms.

The following example is given to more fully illustrate the invention, in which the ports or percentages employed are by weight.

*Example 1*

To an agitated equimolar mixture of tetraethyl lead and tetramethyl lead (the tetramethyl lead is introduced as 80% solution in toluene), 0.3 weight percent of boron trifluoride diethyl etherate, based on the weight of the alkyl lead, is added. The reaction is carried out at room temperature. After five minutes, the reaction mixture is washed with alkaline solution (1% aqueous sodium hydroxide) to remove the catalyst. The washed mixture of alkyl leads is then blended in the usual manner with a requisite amount of ethylenedibromide and/or ethylenedichloride, antioxidants and dye.

Analysis of the redistributed mixture was found to be as follows:

Tetraalkyl lead: | Mol percent
--- | ---
Tetramethyl | 4.2
Trimethylethyl | 24.6
Dimethyldiethyl | 42.4
Methyltriethyl | 24.4
Tetraethyl | 4.4

Redistribution may be carried out in the ethylenedibromide and/or the ethylenedichloride normally present in the commerical antiknock blends.

It is well known that by changing the proportions of a mixture of alkyl lead compounds one obtains different proportions of products in the distribution mixture. The present invention can be employed in carrying out the redistribution of alkyl groups in mixtures of any proportions. In place of the 50:50 molar mixture used in the above example, there may be used other mixtures such as those composed of 25 to 75 mol percent of tetramethyl lead and 75 to 25 mol percent of tetraethyl lead to produce equilibrium redistribution mixtures useful as antiknock agents. Likewise, the catalysts of this invention effect redistribution of alkyl groups in an alkyl lead which contains at least two different alkyl groups in the molecule, such as dimethyldiethyl lead, monothyltriethyl lead, etc. The resulting effect is the same as if two different alkyl leads were used in proportion, providing the same number of the different alkyl groups.

It has also been found that the redistribution of the alkyl groups on the lead takes place almost instantaneously. In runs using from 0.1% to approximately 2% by weight of the boron trifluoride diethyletherate, the redistribution was completed within 30 seconds, and therefore the time of reaction disclosed in the above example can be materially shortened. Because of the rapidity with which the redistribution takes place, this process can be carried out in a continuous manner by feeding the boron trifluoride diethyletherate into a stream of the alkyl lead compounds, preferably in a pipeline reactor.

While ordinary atmospheric temperatures are preferred, the redistribution can be carried out at temperatures as low as 0° C. Temperatures higher than atmospheric are not required.

Any haze that may result from the use of the boron-trifluorideetherate may be removed by ordinary filtration.

The boron trifluoride etherate catalyst employed in the present invention does not form the very large amount of solid by-products normally occuring in the aluminum chloride reaction. Furthermore, the reaction mixture in non-corrosive to the ordinary steel equipment and does not produce a corrosive composition when the residue of the boron compound is left in the alkyl lead mixtures. While in the above example the treated material is subjected to an alkaline wash, this is primarily to produce a clear product; however, the unwashed product has been found to be entirely satisfactory for use since the boron compound or residues do not materially affect the quality of the tetraalkyl mixtures.

I claim:

1. A process of effecting redistribution of alkyl radicals in alkyl lead compositions containing at least two different alkyl groups, which comprises contacting said alkyl lead composition with from 0.1% to 3.0% by weight, based on the weight of the alkyl lead in said composition, of a boron trifluoride alkyl etherate at ordinary atmospheric temperatures.

2. The process of claim 1 wherein the alkyl lead composition contains a hydrocarbon solvent.

3. The process of claim 1 in which the alkyl lead composition contains a scavenger of the group consisting of ethylenedichloride, ethylenedibromide and mixtures thereof.

4. The process of claim 1 wherein the alkyl lead composition comprises a mixture of tetramethyl lead and tetraethyl lead.

References Cited in the file of this patent

UNITED STATES PATENTS

| | | |
|---|---|---|
| 2,270,108 | Calingaert et al. | Jan. 13, 1942 |
| 2,270,109 | Calingaert et al. | Jan. 13, 1942 |
| 2,447,926 | Wiczer | Aug. 24, 1948 |
| 2,479,900 | Calingaert | Aug. 23, 1949 |
| 2,479,902 | Calingaert | Aug. 23, 1949 |
| 2,588,358 | Carlson et al. | Mar. 11, 1952 |
| 2,660,591 | Calingaert | Nov. 24, 1953 |
| 2,801,273 | Bohlbro et al. | July 30, 1957 |